Patented Sept. 26, 1950

2,523,934

UNITED STATES PATENT OFFICE 2,523,934

N-ACYLATED AMINO-METHYL ETHERS AND PROCESS OF MAKING SAME

Otto Albrecht, Neuewelt, near Basel, Richard Sallmann, Gelterkinden, and Charles Graenacher, Riehen, Switzerland, assignors to Ciba Limited, Basel, Switzerland, a Swiss firm No Drawing. Application August 20, 1948, Serial No. 45,435. In Switzerland April 8, 1943

13 Claims. (Cl. 260—404.5)

This application is a continuation in part of our application Serial No. 524,778, filed March 2, 1944, now abandoned.

U. S. Patent No. 2,146,408 describes the production of compounds of the general formula R—CONH—CH2—N(tert)—X wherein R stands for an alkyl radical containing not less than 8 carbon atoms; the group N(tert) represents the molecule of a tertiary base, such as trimethylamine or pyridine; and X represents the acidic radical of a weak acid as typified by acetic or formic acid.

These quaternary ammonium compounds may be prepared by first reacting together the amide of a higher fatty acid with formaldehyde and the desired acid of the formula HX in presence of a liquid diluent. The resulting intermediate product is then further reacted with the desired base, while maintaining an excess of diluent throughout the reaction.

As an alternative to the above two-step procedure all four reactants, namely, long-chain alkyl-amide, formaldehyde, acid of formula HX, and tertiary base may be reacted jointly, an excess of acid or base being present throughout the reaction period.

These known processes have the disadvantage that a diluent must be used. The diluent, however, cannot be regenerated quantitatively, since the quaternary ammonium salts are not readily isolable in dry form, as is expressly indicated in the specification. Therefore, it is recommended to leave the quaternary ammonium salts in the reaction mass and to use the latter as a whole in the process of treating a fabric.

Moreover, the quaternary ammonium salts of the cited specification are unstable, as may be seen from lines 30—32, right hand column of page 2. That passage indicates that the reaction products cannot easily be isolated in dry form without decomposition occurring.

When produced in the presence of an excess of acid, separation of the reaction products from the liquid by decanting, filtering or centrifuging without drying, a process mentioned on page 2, right hand column, lines 36—39, does not lead to storable salts, since the adherent acid is bound gradually to decompose the rather sensitive reaction products.

When produced in the presence of an excess of base, this relatively expensive material is lost in case the entire reaction mixture is used as textile assistant; or else it has to be regenerated, which involves a considerable extra expense.

In view of these facts it is clear that a process which avoids these disadvantages and leads in a simpler and more economic manner to stable and storable products constitutes an important step forward in the art involving technical merit.

We have now found that new N-acylated aminomethyl ethers which are stable and storable are obtained if amides having at least twelve connected carbon atoms and at least one hydrogen atom linked to at least one amide nitrogen atom are condensed with formaldehyde and tertiary amines containing at least one hydroxyl group linked to an alkyl radical consisting of at least 2 carbon atoms, all of the said tertiary amine being present as a free base. If desired a substance having an alkaline reaction may be present during the reaction. The amines thus obtained may be converted into salts.

In this way products with the atomic grouping

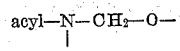

for instance products of the formula

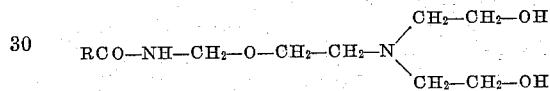

are obtained. The products of the present invention are thus entirely different from the quaternary ammonium salts of the cited specification. Moreover, the process is much simpler than those of the cited specification, the use of a diluent being avoided. Furthermore, stable and storable free bases are obtained as primary reaction products. Free bases cannot be obtained in the process of the mentioned specification, since the presence of an acid, be it in the free state or in the form of an acid, is absolutely necessary. A further advantage to be mentioned is that the present process leads in a simple manner to salts of the bases obtained as primary reaction products. Addition of the calculated amount of an acid yields dry neutral salts which are stable and storable, whereas the quaternary ammonium salts of the cited specification are not readily isolable in dry form without decomposition. Furthermore, the present process is superior to those of the afore-mentioned specification not only with regard to the economic procedure and stability and storability of the products, but also because it leads to products with a better solubility when triethanolamine is used as the base in both processes.

It is only by this process that the disadvantages of the process of U. S. Patent No. 2,146,408, which were clearly recognized by the inventor of the known process, can be overcome.

The water-soluble salts of the bases of the present invention are cation active and characterized by a high affinity for cellulose fibers in case the bases contain an aliphatic or cycloaliphatic radical with at least twelve carbon atoms.

The amides which are to be used here are derived from carboxylic acids, further from ammonia and basic monosubstitution products thereof. They may therefore represent e. g. carboxylic acid amides, urethanes, ureas and hydrazides.

As starting materials there may for example be used amides which are derived from aliphatic, aromatic, aliphatic-aromatic, cycloaliphatic and heterocyclic carboxylic acids. Among these there are named: lauric acid, cocoanut fatty acid, palmitic acid, stearic acid, oleic acid, linoleic acid, hardened whale oil fatty acid; also para-stearoylamino-benzoic acid, tetrahydronaphthyl acetic acid, resin acids or naphthenic acids, such as abietic acid. Amides which are derived from fatty acids containing at least 12 carbon atoms are particularly valuable as starting materials. As starting materials there are also suitable the N-substitution products of the amides which follow from the foregoing compilation, which still contain at least one hydrogen atom linked to the nitrogen atom, such as N-methyl-, N-ethyl-, N-hydroxyethyl-, N-dihydroxypropyl lauric acid amide. As amides of the urea group there come into consideration, for example, monododecyl-, monooctadecyl-, N:N'-didodecyl-urea; as amides of the urethane group for example octadecyl-urethane; also diurethanes, such as methylene-dioctadecylurethane. As amides of the hydrazide group there may be used for example the hydrazides corresponding to the above mentioned amides, such as lauric acid hydrazide.

The formaldehyde which is to be used in this process is applied preferably in the form of its polymeric modifications, for example in the form of para-formaldehyde.

Among the tertiary amines which contain at least one hydroxyl group linked to an alkyl radical consisting of at least 2 carbon atoms there are named for example the following: triethanolamine, tripropanolamine, tributanolamine, butyl-diethanolamine, di-(hydroxyethyl)-aniline, di-(hydroxyethyl)-cyclohexylamine, also hydroxyalkylethers or polyglycolic ethers of these amines, such as the trioxyethylether of triethanolamine or the ethers of triethanolamine or of other tertiary hydroxyalkylamines, obtained by the action of more than 3 mols. of ethylene oxide, e. g. by reaction with 6 to 18 mols. of ethylene oxide; also polyalkylene polyamines containing hydroxyalkyl groups.

The present process is carried out preferably in such a manner that the amide is chemically combined or reacted with formaldehyde to form at first an N-methylol compound, and then allowing this compound to act in a second phase on the amine of the indicated kind. These N-methylolamides are either known or can be prepared according to known processes.

The reaction of the amides with formaldehyde and the amines of the indicated kind is performed preferably in the heat, for example at a temperature exceeding 90° C., for instance at 100–140° C., if desired in the presence of an inorganic alkaline reacting substance, for instance in the presence of anhydrous sodium or potassium carbonate, or trisodium phosphate. In general it is advantageous to add a small quantity of boric acid, for instance 1–2 per cent. calculated on the reaction mass, to the mixture of the reactants. The rate of reaction and the yield are improved by this addition. Instead of boric acid its anhydride or a salt of a boric acid may be added. The procedure is similar when adopting the previously mentioned modification of the present process: reaction of the amide with formaldehyde to form the N-methylol compound and allowing it to act on the amines of the indicated kind. The reaction is accelerated if the water formed by the condensation is removed, for instance by a current of air or more advantageously by working under reduced pressure. It has been found generally advantageous to use more than 1 mol. of formaldehyde for 1 mol. of amide; similarly it is appropriate to work with an excess of formaldehyde when using methylolamides. The solubility of the final products is improved by these measures.

For the conversion into water-solublé salts the products of this process can be treated with an equivalent amount of acetic acid or formic acid.

The products of the present process, as far as the free bases are concerned, can be designated as N-acylated amino methyl ethers in which the acyl radical linked to the nitrogen atom of the amino methyl ether bridge contains at least twelve connected carbon atoms and in which the radical bound to the oxygen atom of the amino methyl ether bridge contains at least one tertiary amino group bound to an alkyl radical of at least two carbon atoms.

The products of the present process contain the atom grouping

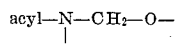

as mentioned above. In this atom grouping the group

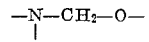

represents an aminomethylether bridge.

Water-soluble products of the present process which contain an acyl radical of a fatty acid having at least 12 carbon atoms, are pronouncedly capillary active and are decomposed on boiling with hydrochloric acid with precipitation of water-insoluble products. Products can be obtained from triethanolamine which contain the atom grouping

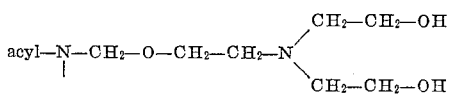

In this atom grouping the radical

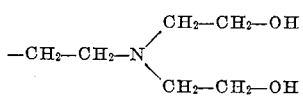

is to be designated as the N-bis-(2-hydroxyethyl)-aminoethyl radical.

The water-soluble salts of the bases of the present invention, for instance those with fatty acids of lower molecular weight can be used as textile assistants. Especially valuable are those salts which contain an aliphatic or cycloaliphatic radical with at least 12 carbon atoms; they can be used as wetting, foaming, dispersing or levelling agents, particularly as very active softening agents, also as agents for preventing the agglommeration of the cellulose wool fibrils in the manufacturing process. Particularly those products which contain an aliphatic radical with at least 16 carbon atoms are very efficient softening agents for textiles, especially cellulose materials, such as rayon and woollen goods. If properly chosen, these salts will present the advantage of impairing the light fastness of dyeings only to a very moderate degree, if at all. The products can be used alone or in combination with other substances usually employed with textile assistants. The free bases of the present invention are useful as emulsifiers.

The following examples illustrate the invention, the parts being by weight unless otherwise stated:

*Example 1*

An intimate mixture consisting of 6.2 parts of oleic acid N-methylolamide containing about 1% of boric acid, 3.3 parts of triethanolamine and 25 parts of dehydrated sodium carbonate is stirred for 1½ hours in a bath at 110–115° C. It is then dissolved at room temperature in a quantity of water which is just sufficient for the dissolution and the new condensation product is precipitated by addition of sodium carbonate. When dry, the new product is a viscous mass of the formula

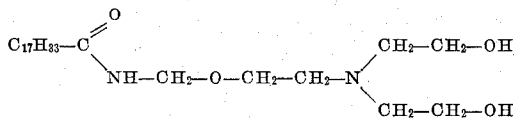

which is taken up by hot water to an opalescent solution which becomes entirely clear on addition of acetic acid and then foams strongly.

The acetate of the new amine obtained for example by mixing 2.5 parts of the above described condensation product with 0.6 part of glacial acetic acid, is an excellent softening agent for rayon. In the same manner an equivalent amount of

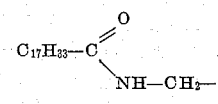

cocoanut fatty acid -N-methylolamide may be condensed with triethanolamine.

*Example 2*

250 parts of commercial stearic acid amide containing about 1% of boric acid or of its anhydride or of a salt of boric acid, for instance, a water-soluble salt, are converted in known manner with the aid of 36.3 parts of paraformaldehyde into stearic acid-N-methylolamide. 160 parts of triethanolamine and 7.3 parts of anhydrous sodium carbonate are added and the whole is heated to 108° C., while stirring, the reaction vessel being evacuated to a pressure of about 540 mm. mercury. Stirring is continued for about 3–4 hours at 108–111° C., after having diminished the pressure to 340 mm. mercury. The condensation product thus obtained (437–440 parts) is subsequently neutralized with 82 parts of glacial acetic acid and converted into a paste by the addition of warm water of about 50° C. This paste is viscous and nearly colorless and is excellently suitable as a softening agent for viscose rayon. The new product is the acetate of an amide of the formula

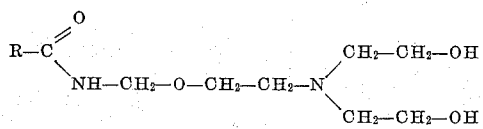

(wherein

is the acid radical of commercial stearic acid).

Instead of stearic acid-N-methylolamide there can also be used a mixture of stearic acid amide with an equimolecular quantity of formaldehyde.

Like stearic acid amide also oleic acid amide can be condensed according to the above described process with triethanolamine.

*Example 3*

30 parts of stearic acid-N-methylolamide from commercial stearic acid, 5.5 parts of triethanolamine and 15 parts of anhydrous sodium carbonate are heated for 3 hours to 108–112° C., while stirring. The liquid portion of the reaction product is then separated hot from solid sodium carbonate. 5 parts of the condensation product thus obtained are mixed with 0.8 part of glacial acetic acid and diluted with cold water to 10 parts. The paste thus obtained is a very good softening agent.

*Example 4*

10 parts of oleic acid-N-methylolamide are mixed with 10 parts of triethanolamine-trioxyethylether and 10 parts of anhydrous sodium carbonate and heated in a stream of nitrogen for about 1½ hours in a bath of 115–120° C. The mixture is subsequently stirred with 24 parts of water, heated to 40–50° C., and the remaining undissolved portion is dried. 18 parts of a viscous mass are obtained which are taken up by water at room temperature to form a nearly clear solution. The new condensation product corresponds to the formula $C_{17}H_{33}-C\underset{NH-CH_2-O-CH_2-CH_2-O-CH_2-CH_2-N}{\overset{O}{\diagup}}\underset{CH_2-CH_2-O-CH_2-CH_2-OH}{\overset{CH_2-CH_2-O-CH_2-CH_2-OH}{\diagup}}$ In similar manner also stearic acid-N-methylolamide can be condensed with triethanolamine-trioxyethylether.

*Example 5*

71.2 parts of stearic acid -N-methylolamide made from commercial stearic acid and containing approximately 1% of boric acid, are stirred for 4 hours in a flask with a stirrer, with 30 parts of N:N-diethylethanolamine and 1.7 parts of sodium carbonate. The volatile parts distilled off during the heating are condensed in a cooling apparatus. The mixture is subsequently stirred for ½ hour under a pressure of about 540 mm. at 108–111° C., 6 parts of N:N-diethyl-ethanolamine 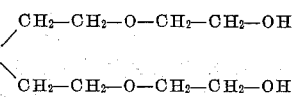 are added and the mixture is heated under atmospheric pressure at the indicated temperature for a further period of 1 hour. For purification the reaction product so obtained is recrystallized from acetone. Unchanged stearic acid-N-methylolamide dissolves comparatively sparingly therein, whereas the ether obtained of the formula

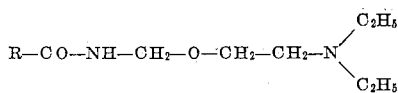

(R—CO—=acyl radical of commercial stearic acid), is easily soluble in acetone and can be separated from the mother liquor by evaporating the solvent. After dissolution in glacial acetic acid and dilution with hot water, the new ether yields a foamy solution. This new ether can be used as a textile assistant, e. g. as a softening agent.

*Example 6*

44 parts of stearic acid-N-methylolamide from ordinary commercial stearic acid, containing approximately 1% of boric acid, 30 parts of triisopropanolamine and 1.1 parts of sodium carbonate are stirred together for 4 hours at 108°–111° C., the pressure being gradually reduced to about 340 mm. The volatile parts which are distilled off are condensed in a cooling apparatus. The new ether so obtained is in the form of a practically colorless, solid mass, which, after dissolution in glacial acetic acid, and dilution with hot water, yields an opal colored solution. For purification one may recrystallize the reaction product from acetone wherein the new ether is more easily soluble than is stearic acid-N-methylolamide. The new product can be used in the form of its acetate as a softening agent for viscose rayon.

*Example 7*

35.1 parts of stearic acid-N-methylolamide made from ordinary commercial stearic acid, 1.1 parts of boric acid, 20 parts of N-oxyethylmorpholine and 0.85 part of sodium carbonate are stirred in a current of nitrogen for 3 hours at 108–111° C. The volatile parts which are distilled off during the heating are condensed in a cooling apparatus. The mixture is then stirred for a further ¼ hour under a pressure of approximately 12 mm. at the indicated temperature. The thus obtained reaction product containing mainly the compound of the formula

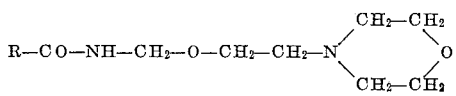

(R—CO—=acyl radical of ordinary commercial stearic acid), yields, after dissolution in hot glacial acetic acid and dilution with boiling water, an opal colored solution of the acetate of the above mentioned amine. For purification the free base may be recrystallized from acetone, in which the new ether is more easily soluble than is the stearic acid-N-methylolamide used as starting material.

*Example 8*

For the softening of chlorinated woollen warn the latter is worked in liquor of a ratio of 1:20 for ½ hour at 30° C., containing 2–4% of the paste of the acetate of the compound described in Example 2 and having the formula

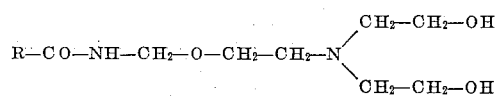

(R—CO—=acyl radical of ordinary commercial stearic acid). The softness of the wool is considerably improved by this treatment.

*Example 9*

For the purpose of softening rayon yarn the following process is used: Viscose rayon yarn is handled for ½ hour in an aqueous liquor containing per liter 0.03 gram of the product described in Example 2, the ratio of goods to liquor being 1:30, then centrifuged and dried. The rayon treated in such a manner has an extraordinarily soft, flowing feel.

What we claim is:

1. Process for the manufacture of an N-acylated amino methyl ether which comprises condensing an amide of a fatty acid containing at least twelve carbon atoms and at least one hydrogen atom linked to an amide nitrogen atom with formaldehyde and a tertiary amine containing at least one hydroxy group bound to an alkyl radical of at least two carbon atoms at a temperature exceeding 90° C., but below the temperature of decomposition of the N-acylated amino methyl ether, all of the said tertiary amine being present during the reaction as a free base.

2. Process for the manufacture of an N-acylated amino methyl ether which comprises condensing an N-methylolamide of a fatty acid containing at least twelve carbon atoms and at least one hydrogen atom linked to an amide nitrogen atom with a tertiary amine of the aliphatic series containing at least one hydroxy group bound to an alkyl radical of at least two carbon atoms at a temperature exceeding 90° C., but below the temperature of decomposition of the N-acylated amino methyl ether, in the presence of an inorganic alkaline reacting substance, all of the said tertiary amine being present during the reaction as a free base.

3. Process for the manufacture of an N-acylated amino methyl ether which comprises condensing an N-methylolamide of a fatty acid containing at least twelve carbon atoms and at least one hydrogen atom linked to an amide nitrogen atom with a tertiary amine of the aliphatic series containing at least one hydroxy group bound to an alkyl radical of at least two carbon atoms at a temperature exceeding 90° C., but below the temperature of decomposition of the N-acylated amino methyl ether, in the presence of formaldehyde and of an inorganic alkaline reacting substance, all of the said tertiary amine being present during the reaction as a free base.

4. Process for the manufacture of an N-acylated amino methyl ether which comprises condensing an N-methylolamide of a fatty acid containing at least twelve carbon atoms and at least one hydrogen atom linked to an amide nitrogen atom with a tertiary amine of the aliphatic series containing at least one hydroxy group bound to an alkyl radical of at least two carbon atoms at a temperature exceeding 90° C., but below the temperature of decomposition of the N-acylated amino methyl ether in the presence of formaldehyde and of an alkali carbonate, all of the said tertiary amine being present during the reaction as a free base and the water liberated in the etherification being eliminated during the reaction at a pressure amounting at most to atmospheric pressure.

5. Process for the manufacture of an N-acylated amino methyl ether of the formula

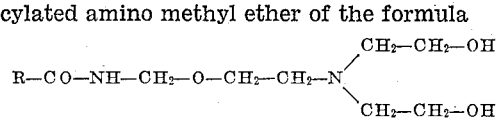

wherein R—CO— is the acyl radical of commercial stearic acid, which comprises condensing one mol of commercial stearic acid N-methylolamide with one mol of triethanolamine at a temperature exceeding 90° C., but below the temperature of decomposition of the N-acylated amino methyl ether in presence of formaldehyde and an alkali carbonate at a reduced pressure, all of the said triethanolamine being present during the reaction as free base, and a small amount of a member selected from the group consisting of boric acid, its anhydride, and a salt of a boric acid being added to the reaction mixture.

6. Process for the manufacture of an N-acylated amino methyl ether of the formula

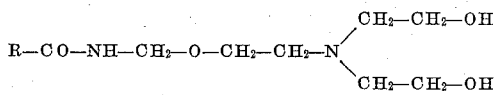

wherein R—CO— is the acyl radical of commercial oleic acid, which comprises condensing one mol of commercial oleic acid N-methylolamide with one mol of triethanolamine at a temperature exceeding 90° C., but below the temperature of decomposition of the N-acylated amino methyl ether in presence of an alkali carbonate, all of the said triethanolamine being present during the reaction as free base, and a small amount of a member selected from the group consisting of boric acid, its anhydride, and a salt of a boric acid being added to the reaction mixture.

7. Process for the manufacture of an N-acylated amino methyl ether of the formula

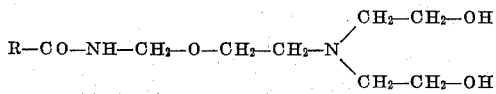

wherein R—CO— is the acyl radical of cocoanut fatty acid, which comprises condensing one mol of cocoanut fatty acid N-methylolamide with one mol of triethanolamine at a temperature exceeding 90° C., but below the temperature of decomposition of the N-acylated amino methyl ether in presence of an alkali carbonate, all of the said triethanolamine being present during the reaction as free base and the water liberated in the etherification being eliminated during the reaction at a pressure amounting at most to atmospheric pressure, and a small amount of a member selected from the group consisting of boric acid, its anhydride, and a salt of a boric acid being added to the reaction mixture.

8. An N-acylated amino methyl ether in which the acyl radical linked to the nitrogen atom of the amino methyl ether bridge is the acyl radical of a fatty acid with at least twelve carbon atoms and in which the radical bound to the oxygen atom of the amino methyl ether bridge contains at least one tertiary amino group bound to an alkyl radical of at least two carbon atoms.

9. An N-acylated amino methyl ether in which the acyl radical linked to the nitrogen atom of the amino methyl ether bridge is the acyl radical of a fatty acid with at least twelve carbon atoms and in which the radical bound to the oxygen atom of the amino methyl ether bridge is an open chain radical containing at least one tertiary amino group bound to an alkyl radical of at least two carbon atoms.

10. An N-acylated amino methyl ether in which the acyl radical linked to the nitrogen atom of the amino methyl ether bridge is the acyl radical of a fatty acid with at least twelve carbon atoms and in which the radical bound to the oxygen atom of the amino methyl ether bridge is the N-bis-(2-hydroxyethyl)-aminoethyl radical.

11. The amide derivative of the formula

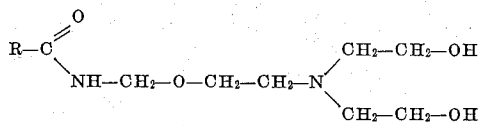

wherein

is the acyl radical of commercial stearic acid.

12. The amide derivative of the formula

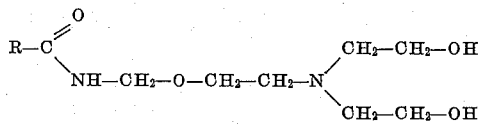

wherein

is the acyl radical of commercial oleic acid.

13. The amide derivative of the formula

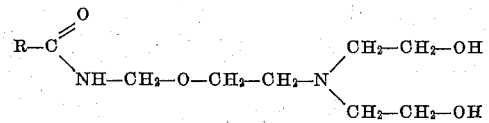

wherein

is the acyl radical of cocoanut fatty acid.

OTTO ALBRECHT.
RICHARD SALLMANN.
CHARLES GRAENACHER.

REFERENCES CITED

The following references are of record in the file of this patent:

UNITED STATES PATENTS

| Number | Name | Date |
| --- | --- | --- |
| 2,146,408 | Shipp | Feb. 7, 1939 |
| 2,448,125 | Sallmann et al. | Aug. 31, 1948 |